United States Patent [19]

Buhrer

[11] Patent Number: 4,987,567
[45] Date of Patent: Jan. 22, 1991

[54] OPTICAL WAVELENGTH MULTIPLEXER/DEMULTIPLEXER AND DEMULTIPLEXER/REMULTIPLEXER

[75] Inventor: Carl F. Buhrer, Framingham, Mass.
[73] Assignee: GTE Laboratories Incorporated, Waltham, Mass.
[21] Appl. No.: 274,242
[22] Filed: Nov. 21, 1988
[51] Int. Cl.$^5$ .......................... H04J 1/00; H04J 14/00
[52] U.S. Cl. ............................. 370/3; 370/2; 455/616; 350/174; 350/401; 350/404
[58] Field of Search ....................... 370/3, 2; 455/616; 350/401, 174, 400, 403, 404, 406

[56] References Cited

U.S. PATENT DOCUMENTS

| | | | |
|---|---|---|---|
| 4,500,178 | 2/1985 | Yeh | 350/404 |
| 4,548,479 | 10/1985 | Yeh | 350/404 |
| 4,685,773 | 8/1987 | Carlsen et al. | 370/2 |

OTHER PUBLICATIONS

"Optical Network Synthesis Using Birefringent Crystals", S. E. Harris et al; Journal of the Optical Soc. of Amer., vol. 54, No. 10; 10–1964.
"Birefringent Chain Filters", Ivan Solc, Journal of the Optical Society of America; vol. 55, No. 6, Jun. 1965.

Primary Examiner—Donnie L. Crosland
Attorney, Agent, or Firm—Victor F. Lohmann, III; James J. Cannon, Jr.

[57] ABSTRACT

A multichannel wavelength demultiplexer has two or more cascaded birefringent filter stages for dividing an input signal consisting of a plurality of adjacent channels of optical signals among a number of outputs, each of said filter stages having a transmission function with even symmetry about optical frequencies at the centers of both the longest and the shortest wavelength channels. This symmetry, common to all transmission functions, permits all birefringent filter stages to be constructed from sequences of the same one size crystal element, thereby greatly lowering the cost of construction because solely one size crystal element is fabricated, tested and assembled. A multichannel multiplexer, identical to the above defined demultiplexer, but operated in reverse, is set forth. A combination multichannel wavelength demultiplexer/remultiplexer consists of a single birefringent filter stage for use in conjunction with multichannel multiplexer/demultiplexer to divide a common set of adjacent wavelength channels on its primary input between its primary and secondary outputs in any combination, and simultaneously to accept at its secondary input different optical signals within the same wavelength channels as those exiting its secondary output and recombine them to exit at its primary output, wherein said single filter stage has a transmission function with even symmetry about optical frequencies at the centers of both the longest and the shortest wavelength channels. This symmetry, common to its transmission function and to those of said multichannel multiplexer/demultiplexer, permits all birefringent filter stages to be constructed also from sequences of the same one size crystal element.

24 Claims, 9 Drawing Sheets

OPTICAL WAVELENGTH MULTIPLEXER/DEMULTIPLEXER AND DEMULTIPLEXER/REMULTIPLEXER

BACKGROUND OF THE INVENTION

This invention pertains generally to the field of fiber optic communications and more particularly to optical components used in such communication systems. Specifically it pertains to optical birefringent filters adapted for use in optical wavelength division multiplexers, demultiplexers and splitters.

In the communications art, the terms "multiplex" and "demultiplex" are often used in several senses. In a specific sense, a multiplexer is a device for combining two or more signals to create a composite signal for transmission on a single channel, while a demultiplexer is a device used to separate two or more signals that were previously combined by a compatible multiplexer and transmitted over a single channel. Thus, a multiplexer and a demultiplexer are essentially complementary devices. A multiplex operation is the simultaneous transmission of two or more signals over a single channel by time division, frequency division, or phase division.

In the case of optical signals, frequency division multiplexing is usually referred to as wavelength division multiplexing and makes use of passive optical filters which are bidirectional by nature. Because of this bidirectionality a wavelength multiplexer, which combines two or more different wavelength signals for transmission on a single carrier medium, such as an optical fiber, can function in reverse as a demultiplexer to separate a multiplexed signal from a single carrier medium into its two or more different wavelength component signals. Such a multiplexer/demultiplexer device, often referred to generically as a multiplexer or less frequently as a demultiplexer, is used at each end of a carrier medium to allow the simultaneous transmission of two or more different wavelength signals in either or both directions.

In the present application, as well as in the prior patents discussed in this application, all of which are assigned to the same assignee, the terms "multiplexer" and "demultiplexer" are used generically, except where the context requires otherwise.

Optical birefringent filters of the type first described by Solc are particularly adaptable for use in wavelength division multiplexers and demultiplexers because they consist of an essentially lossless sequence of birefringent crystal elements between two polarizing devices. Their transmission characteristics are even periodic functions of optical frequency that may be shaped as desired by choosing an appropriate number of equal length elements and their rotational orientations according to a synthesis procedure outlined by S. E. Harris, E. O. Ammann, and I. C. Chang, J. Opt. Soc., Amer. 54(10), 1267, (1964).

P. Melman, W. J. Carlsen, and B. Foley, Elect. Lett. 21(15), 634(1985), used a single birefringent element between two polarizing beam splitters to make a polarization insensitive wavelength multiplexer/demultiplexer that is useful in fiber optic systems. They first split the input beam into two orthogonal plane polarized components that passed in parallel through the birefringent element and then were recombined in the second polarizing beam splitter to provide two output beams consisting of the input light separated according to wavelength.

Carlsen and Melman proposed an n channel multiplexer/demultiplexer configured as a tree structure of n-1 two-channel multiplexers/demultiplexers, each with a single birefringent element. See U.S. Pat. No. 4,566,761 issued Jan. 28, 1986, and U.S. Pat. No. 4,685,773 issued Aug. 11, 1987, a continuation-in-part thereof. However, a sequential configuration of only $\log_2 n$ stages is possible when each stage contains several birefringent elements in a Solc-type filter. See U.S. Pat. No. 4,745,591, issued May 7, 1988 to B. Foley. In the left to right demultiplexer mode of operation disclosed in the Foley patent, each stage would have a transfer function approximating a square wave, and successive stages would have halved periods. An input beam with n wavelength components would be demultiplexed into two, four, and finally n output beams each containing only one wavelength. Successive stages would consist of two polarizing beam splitters between which would be located an appropriate number of elements to achieve the desired transfer function.

Figure 1A:
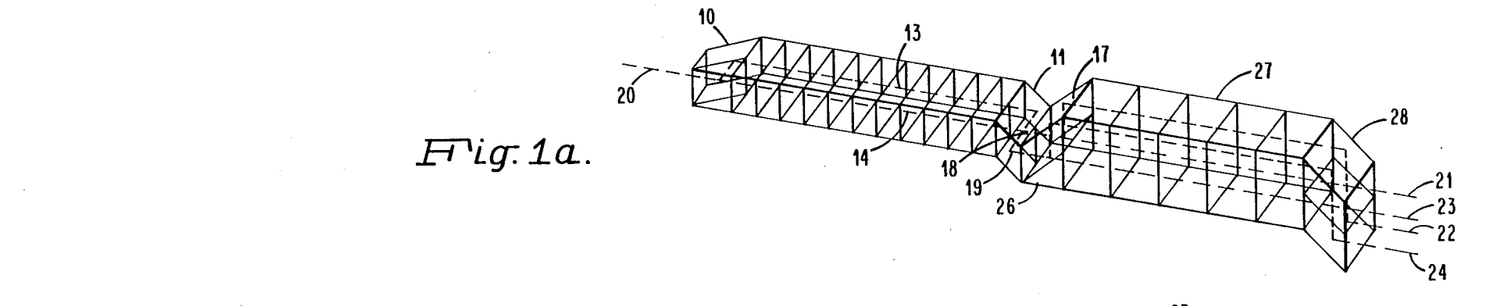
FIGS. 1a, 1b and 1c, are diagrams depicting the perspective, top and side views respectively of one embodiment of a prior art multiple channel wavelength division multiplexer/demultiplexer.
Figure 1B:
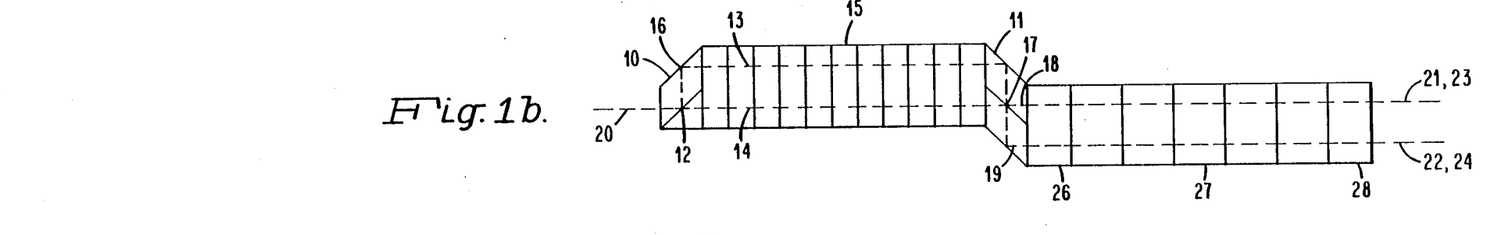
Figure 1C:
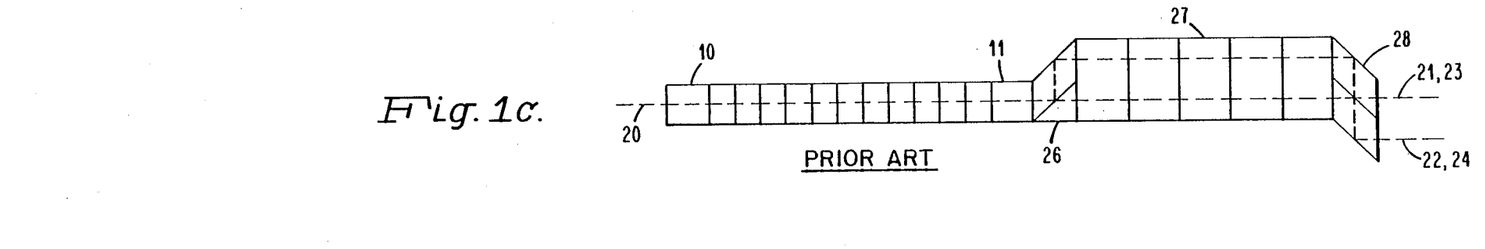
Figure 2A:
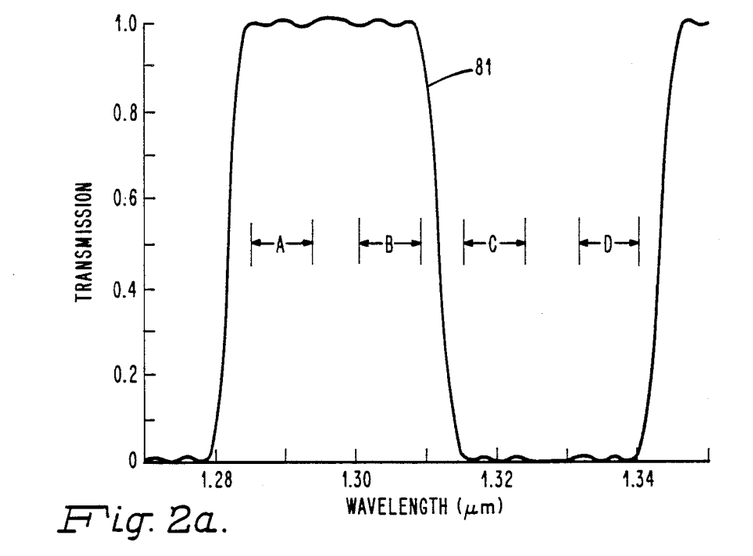
FIGS. 2a and 2b illustrate transmission functions for two of the stages of FIG. 1a, 1b and 1c, FIG. 2a representing the transmission function for the birefringent filter closer to a beam to be demultiplexed in a first stage, and FIG. 2b representing the transfer function for the birefringent filter in a second demultiplexing stage.

The prior art relative to the present invention is the configuration disclosed by B. Foley in U.S. Pat. No. 4,745,591. It consists of two successive stages of Solc-type filters, each consisting of several birefringent elements between polarizing beam splitters as shown in FIGS. 1a, 1b and 1c of this application. In the left to right demultiplexer mode of operation, these stages separate an input beam 20 into four output beams 21, 22, 23, and 24. Each output contains light wavelengths in only one of the optical wavelength bands determined by the filter transmission functions 81 and 82 shown in FIGS. 2a and 2b. The device is reversible, and in the right to left multiplexer mode, four separate beams 21, 22, 23, and 24 entering on the right merge and exit as beam 20, provided that each consists only of light within the optical wavelength bands determined by the same transmission functions.

In terms of its operation as demultiplexer, referring to FIGS. 1a, 1b, and 1c, input beam 20 enters beam splitter prism 10 where only its vertically polarized component 13 is reflected by dielectric multilayer coating 12 and thereby separated from its horizontally polarized component 14 which continues into the sequence 15 of eleven birefringent crystal elements. Component beam 13 is again reflected internally in prism 10 at facet 16 which is parallel to the plane of coating 12, FIGS. 1a and 1b, and also traverses sequence 15 parallel to component beam 14. After undergoing wavelength dependent polarization changes, both enter beam splitter 11 where component 13 is again internally reflected and recombined with component 14 at dielectric multilayer coating 17. Vertically and horizontally polarized components of beams 13 and 14 are reflected or transmitted respectively by this polarizing coating 17. Wavelength components of input beam 20 that fall within channels A and B of transmission function 81 of FIG. 2a undergo essentially no net change in polarization state in traversing Solc-type filter sequence 15 and appear in beam 18, while wavelength components that fall within channels C and D are essentially converted to the orthogonal polarization state and appear in beam 19.

The second filter stage functions in essentially the same manner except that it is rotated in orientation by 90 degrees such that its parallel input beams 18 and 19 are processed independently. Each is separated by input polarizing beam splitter 26 into horizontally and vertically polarized components which traverse sequence 27 of five birefringent crystal elements and recombine in output polarizing beam splitter 28. Wavelength components of input beams 18 or 19 that fall within channels A and C of transmission function 82 of FIG. 2b undergo essentially no net change in polarization state in traversing Solc-type filter sequence 27 and appear in beams 21 and 23, while wavelength components that fall within channels B and D are essentially converted to the orthogonal polarization state and appear in beams 22 and 24.. Together the two stages separate wavelength components of input beam 20 within channels A, B, C, and D of FIGS. 2a and 2b into the four output beams 21, 22, 23, and 24 respectively.

Figure 2B:
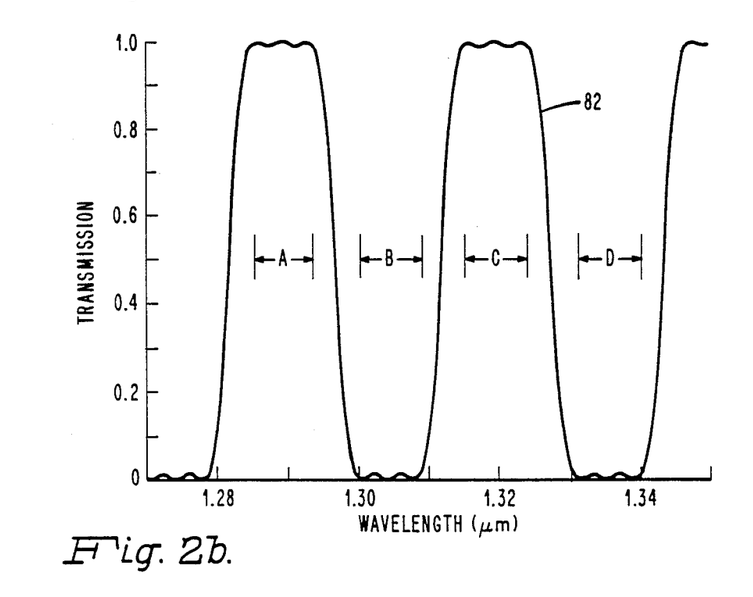

In this prior art four-channel multiplexer/demultiplexer, transmission function 82 of FIG. 2b spans two channels per period and is obtained using a synthesized Solc-type birefringent filter consisting of 5 quartz crystals 5.978 mm long. The longer period transmission function 81 of FIG. 2a spans four channels per period and its birefringent filter requires 11 quartz crystals 3.008 mm long to achieve an equally sharp wavelength cutoff characteristic. The former has even symmetry about optical frequencies centered in each channel A through D, while the latter has even symmetry about optical frequencies midway between channels A and B and midway between channels C and D. These symmetry frequencies correspond to the beginning and midpoints of the two even periodic transmission functions. Although the crystal lengths are approximately in 2:1 ratio because of the 1:2 ratio of the periods, the offset between the beginnings of the periods prevents them from being in an exact 2:1 ratio. Thus, the best prior art requires crystal elements of different sizes in each stage, leading to complex calculations of size and increased costs of manufacture and assembly.

OBJECTS OF THE INVENTION

A principal object of this invention is to provide for a new and improved multichannel birefringent multiplexer/demultiplexer wherein successive stages are designed with a set of transmission functions such that all stages can be constructed using the same size single crystal element.

Another object of this invention is to provide a set of single stage channel demultiplexer/remultiplexer devices with compatible transmission functions that can divide the same n channels between a primary group and a secondary group in any combination and simultaneously recombine the primary channel group with a replacement group of secondary channels, and which can also be constructed using the same size single crystal element, whereby the mode of construction facilitates the accurate matching of the wavelength channels among the stages of the multichannel multiplexer/demultiplexer and between these channels and those of the compatible single stage channel demultiplexer/remultiplexer devices, thereby greatly lowering the cost of construction because only one size crystal element must be fabricated, tested and assembled.

SUMMARY OF THE INVENTION

In accordance with one aspect of the invention, a multichannel wavelength demultiplexer has two or more cascaded birefringent filter stages for dividing an input signal consisting of a plurality of adjacent channels of optical signals among a number of outputs, wherein each of said filter stages has a transmission function with even symmetry about optical frequencies at the centers of both the longest and the shortest wavelength channels. This symmetry, common to all transmission functions, permits all birefringent filter stages to be constructed from sequences of the same one size crystal element, that is, the identical elements of each birefringent stage are identical to the elements of every other birefringent stage, the number of identical elements in each stage being determined by said transmission functions, thereby greatly lowering the cost of construction because solely one size crystal element is fabricated, tested and assembled.

In accordance with another aspect of the invention, a multichannel multiplexer, identical to the above defined demultiplexer, but operated in reverse, is set forth.

In still another aspect of the invention, a combination multichannel wavelength demultiplexer/remultiplexer consists of a single birefringent filter stage for use in conjunction with the above defined multichannel multiplexer to divide a common set of adjacent wavelength channels on its primary input between its primary and secondary outputs in any combination, and simultaneously to accept at its secondary input different optical signals within the same wavelength channels as those exiting its secondary output and recombine them to exit at its primary output, wherein said single filter stage has a transmission function with even symmetry about optical frequencies at the centers of both the longest and the shortest wavelength channels. This symmetry, common to its transmission function and to those of the multichannel multiplexer with which it is used, permits all birefringent filter stages to be constructed from sequences of the same one size crystal element, that is, the identical elements of each birefringent stage are identical to the elements of every other birefringent stage, the number of identical elements in each stage being determined by said transmission functions, thereby greatly lowering the cost of construction because solely one size crystal element is fabricated, tested and assembled.

BRIEF DESCRIPTION OF THE DRAWINGS

FIG. 7 is a plot of the seven transmission functions of FIGS. 4a, 4b, 4c, 5a, 5b, 5c and 5d.

DESCRIPTION OF PREFERRED EMBODIMENTS

Figure 3A:
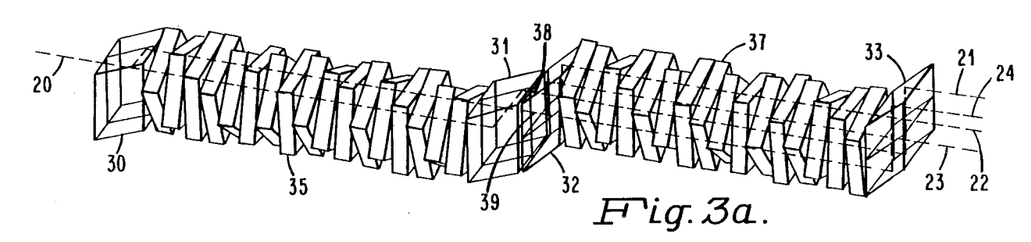
FIGS. 3a, 3b and 3c are diagrams depicting the perspective, top and side views respectively of one embodiment of the multiplexer/demultiplexer of the present invention.
Figure 3B:
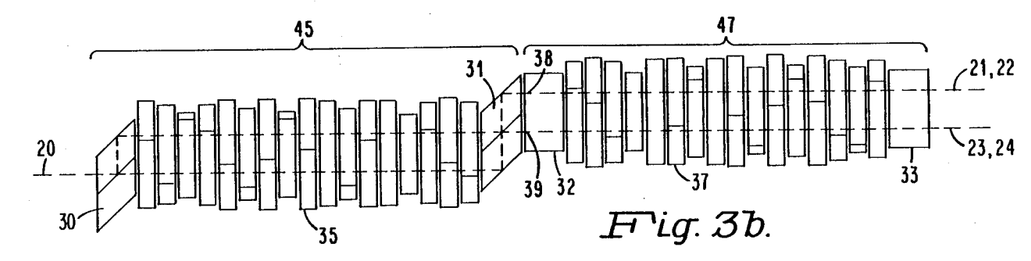
Figure 3C:
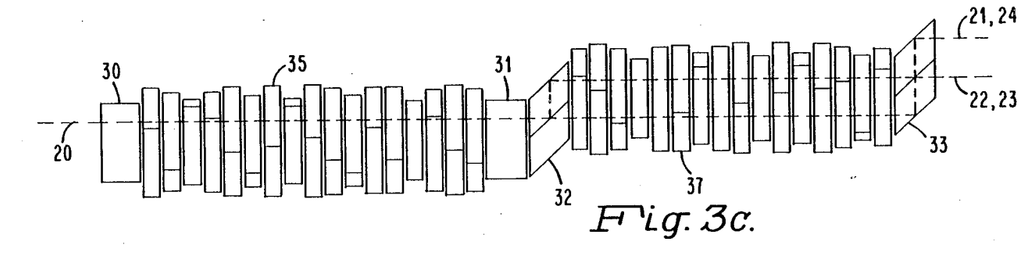

Referring again to the drawings, a four-channel embodiment of the multichannel multiplexer/demultiplexer according the present invention is shown in FIGS. 3a, 3b and 3c. In a demultiplexing mode, beam 20 is input to first and second birefringent filter stages 45 and 47 consisting of sequences 35 and 37 of identical crystal elements which have different rotational orientations around the optical path direction. Each element has a 10 mm square cross-section and is cut from crystalline quartz with its trigonal optic axis perpendicular to one of its sides and parallel to its two square and parallel optically polished faces. Affixed to opposite ends of each sequence are polarizing beam splitter prisms, 30, 31, 32, and 33 such as described by Buhrer in U.S. Pat. No. 4,671,613. The second filter stage 47 is turned ninety degrees relative to the first filter stage 45 so that the two filtered beams 38 and 39 emerging from the first stage are processed independently in the second stage and emerge as four output beams 21, 22, 23, and 24, each consisting of one demultiplexed channel. The same configuration can function as a multiplexer by operation in reverse, that is, four input beams 21, 22, 23, and 24, each at the proper channel wavelength, pass through stages 47 and 45, are combined into a single beam and emerge as beam 20.

Figure 4A:
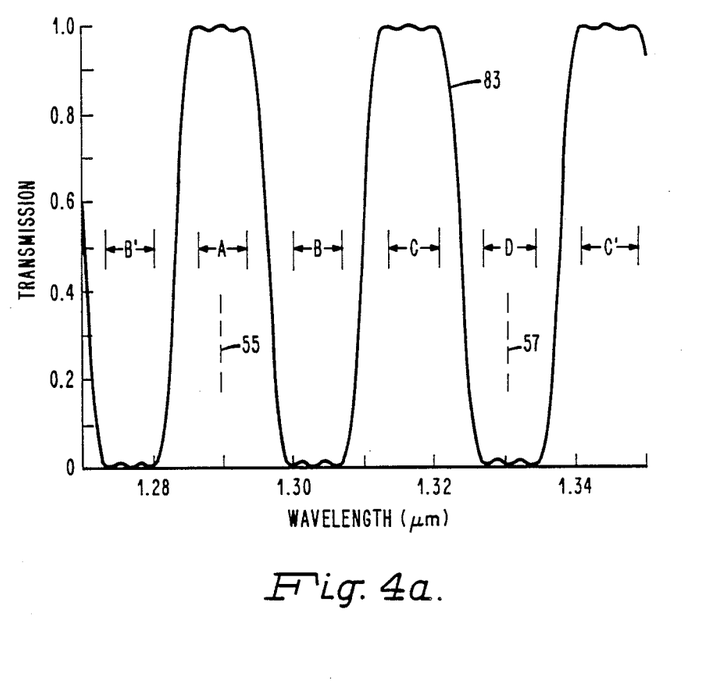
FIGS. 4a, 4b and 4c illustrate transmission functions, any two of which may be used with the two filter stages of the multiplexer/demultiplexer of FIGS. 3a, 3 b and 3c.
Figure 4B:
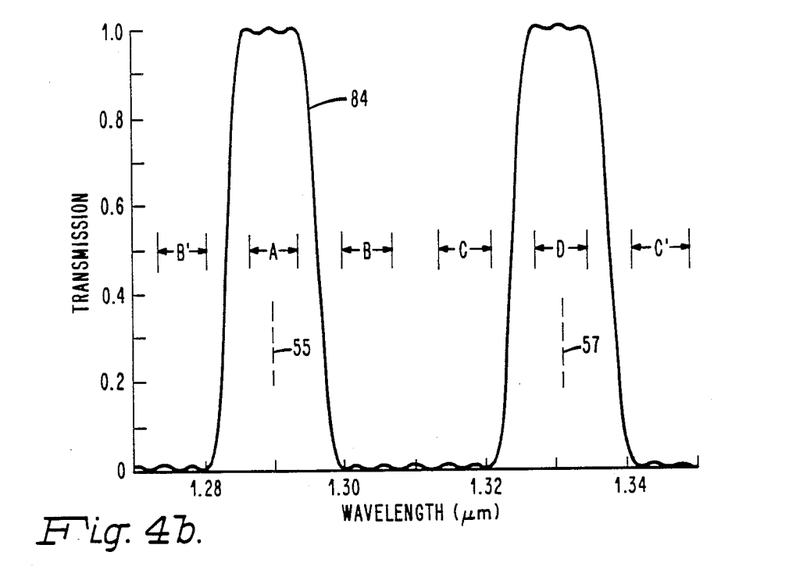
Figure 4C:
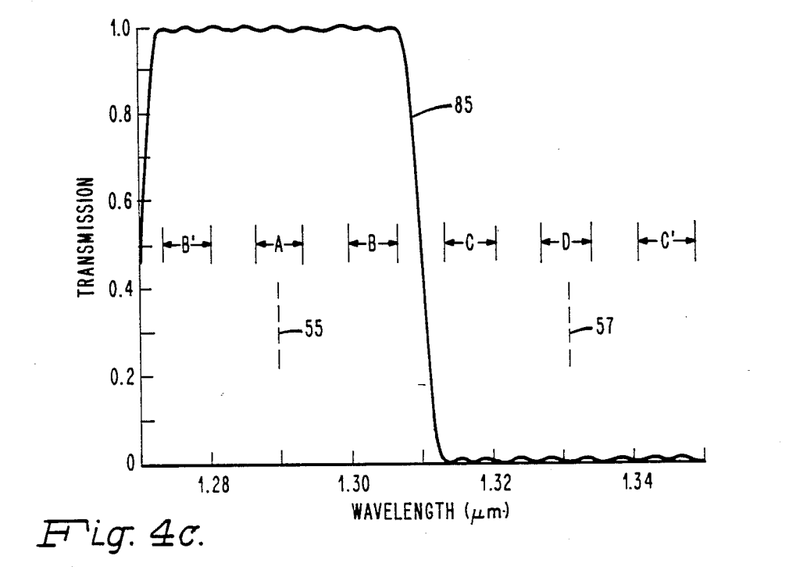

The primary characteristics that distinguish the present invention from the prior art are transmission functions 83, 84, and 85 shown in FIGS. 4a, 4b, and 4c, of which any two can be used for the two filter stages 45 and 47. All have even symmetry about the optical frequencies 55 and 57 at the centers of the end channels A and D respectively of the multichannel sequence. Each approximates to a degree limited by the number of its Fourier components an ideal function having the value of one in the two channels whose linear polarization state is to be unchanged by the bifringent filter and zero in the two channels whose polarization is to be changed to the orthogonal state by the birefringent filter. They represent the three ways in which the four channels can be divided into two groups of two channels each. The rotational orientations of the elements in filter stages 45 and 47 are synthesized according to the procedure of Harris et al., supra, from a number of identical, equal length birefringent crystal elements which have an integral number of half-waves of retardation at these two optical frequencies. As shown in FIG. 3, sequence 35 consists of seventeen and sequence 37 consists of sixteen quartz crystal elements. When their thickness is chosen to be 2.243 mm, they have 30 and 29 half-waves of retardation at 1.290 m and 1.331 m which become the centers of channels A and D respectively. In between are channels B and C centered at 1.30 m and 1.31 m. Channel widths of 0.0065 μm allow all four channels to fit within the various passbands and stopbands of transmission functions 83, 84 and 85. Also shown are channels B' and C' at 1.277 μm and 1.344 μm. These are outside the normal range of the four-channel multiplexer/demultiplexer, but signals within them would be transmitted in the same way as channels B and C respectively, because of the symmetry of all of the transmission functions about 55 and 57.

Transmission function 83 of FIG. 4a has nearly flat passbands and stopbands each with two equal ripples reaching values of 0.99 or 0.01, and it is a fifteenth order function with six channels per period. Its corresponding birefringent filter can be synthesized using fifteen quartz crystal elements 2.243 mm in thickness. When one stage of the multichannel multiplexer/demultiplexer uses this filter sequence, it passes plane polarized wavelength components of input beam 20 that fall within channels A and C with essentially no net changes in polarization state, while wavelength components that fall within channels B and D convert to the orthogonal polarization state.

Transmission function 84 of FIG. 4b has nearly flat passbands with two equal ripples reaching a value of 0.99 and nearly flat stopbands with five equal ripples reaching a value of 0.01, and it is a sixteenth order function with six channels per period. Its corresponding birefringent filter can be synthesized using sixteen quartz crystal elements 2.243 mm in thickness. When one stage of the multichannel multiplexer/demultiplexer uses this filter sequence, it passes plane polarized wavelength components of input beam 20 that fall within channels A and D with essentially no net change in polarization state, while wavelength components that fall within channels B and C convert to the orthogonal polarization state.

Transmission function 85 of FIG. 4c has nearly flat passbands and stopbands, each with eight equal ripples reaching values of 0.99 or 0.01, and it is a seventeenth order function with six channels per period. Its corresponding birefringent filter can be synthesized using seventeen quartz crystal elements 2.243 mm in thickness. When one stage of the multichannel multiplexer/demultiplexer uses this filter sequence, it passes plane polarized wavelength components of input beam 20 that fall within channels A and B with essentially no net change in polarization state, while wavelength components that fall within channels C and D convert to the orthogonal polarization state.

In the preferred embodiment shown in the views of FIGS. 3a, 3b and 3c sequence 35 of birefringent filter stage 45 is constructed from seventeen quartz crystal elements 2.243 mm in thickness so as to have transmission function 85 of FIG. 4c, while sequence 37 of birefringent filter stage 47 is constructed from sixteen quartz crystal elements 2.243 mm in thickness so as to have transmission function 84 of FIG. 4b. Together, the two stages separate wavelength components of input beam 20 within channels A, B, C, and D of FIGS. 4b and 4c into four output beams 21, 22, 23, and 24, respectively. Alternatively, the sequence of these stages can be reversed; or transmission function 83 of FIG. 4a may be used in place of either 84 of FIG. 4b or 85 of FIG. 4c. Then, wavelength components within channels A, B, C, and D would also be separated into four output beams, but with different assignments among output beams 21, 22, 23, and 24. In both stages 45, and 47 and with all three transmission functions 83, 84, and 85, all the quartz crystal elements in sequences 35, and 37 are identical in size.

Figure 6:
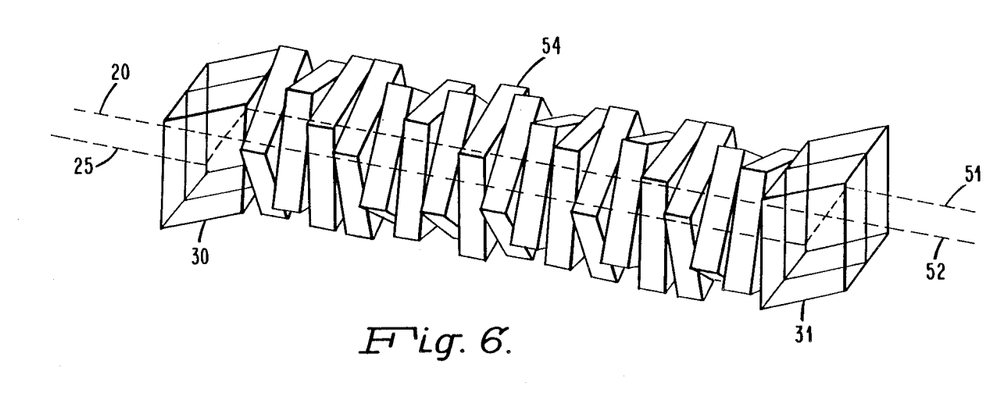
FIG. 6 is a perspective view of a single stage combination channel demultiplexer/remultiplexer substantially the same as the first stage of the multiplexer/demultiplexer of FIGS. 3a, 3b and 3c.

Single stage combination multichannel wavelength demultiplexer/remultiplexer devices can be constructed as shown in FIG. 6. They are essentially the same as the first stage 45 of the multichannel multiplexer/demultiplexer of FIG. 3, but include secondary input beam 25 in addition to the primary input input beam 20. By using the same transmission functions 83, 84, or 85 of FIGS.

4a, 4b, or 4c, the wavelength components of primary input beam 20 within channels A, B, C, and D are divided between two output beams with two channels per output. Those whose linear polarization state remains essentially unchanged emerge as output beam 51, while wavelength components whose polarization changes to the orthogonal state emerge as output beam 52. Specifically, when the filter sequence 54 is synthesized to obtain transmission function 83 of FIG. 4a, wavelength components within channels A and C emerge as beam 51, and those within channels B and D emerge as the beam 52. When the filter sequence 54 is synthesized to obtain transmission function 84 of FIG. 4b, wavelength components within channels A and D emerge as beam 51, and those within channels B and C emerge as beam 52. When the filter sequence 54 is synthesized to obtain transmission function 85 of FIG. 4c, the wavelength components within channels A and B emerge as beam 51, and those within channels C and D emerge as the beam 52.

By using one of the transmission functions 86, 87, 88, or 89 of FIGS. 5a, 5b, 5c, or 5d, the wavelength components of the primary input beam 20 within channels A, B, C, and D are divided with one channel in one output beam and the other three channels in the other output beam. Those whose linear polarization state remains essentially unchanged emerge as beam 51, while wavelength components whose polarization reverses emerge as output beam 52. Specifically, when filter sequence 54 is synthesized to obtain transmission function 86 of FIG. 5a, the wavelength components within channel A emerge as beam 51, and those within channels B, C, and D emerge as beam 52. When the filter sequence 54 is synthesized to obtain transmission function 87 of FIG. 5b, the wavelength components within channel B emerge as beam 52, and those within channels A, C, and D emerge as beam 51. When the filter sequence 54 is synthesized to obtain transmission function 88 of FIG. 5c, the wavelength components within channel C emerge as beam 52, and those within channels A, B and D emerge as beam 51. When the filter sequence 54 is synthesized to obtain transmission function 89 of FIG. 5d, the wavelength components within channel D emerge as beam 52, and those within channels A, B and C emerge as beam 51. Thus, these seven transmission functions 83 through 89, shown together in FIG. 7, form the basis for a set of seven single stage splitter devices that can divide an input beam with wavelength components within four input channels between two output beams in any possible combination. They are plotted in FIG. 7 over a 1.5 period interval to show the inverted channel sequence of the two adjacent sets of unused channels A', B', C', and D'.

The principal application of the single stage multichannel wavelength demultiplexer/remultiplexer device shown in FIG. 6 is to separate wavelength components of primary input beam 20 that are within one of the four channels and divert them to the secondary output and simultaneously to recombine wavelength components within the remaining three channels with wavelength components of secondary input beam 25 that are within that same one channel to comprise the primary output beam. For example, with the filter sequence 54 synthesized to obtain transmission function 89 of FIG. 5d as described above, wavelength components within channels A, B, C, and D entering as the primary input beam 20 are divided to separate those within channel D which emerge as secondary output beam 52. Wavelength components of secondary input beam 25, all within channel D are simultaneously recombined with those within channels A, B, and C and emerge as primary output beam 51.

In a fiber optic communication system this single stage multichannel wavelength demultiplexer/remultiplexer device would be used at some midpoint of a wavelength multiplexed fiber circuit to separate one wavelength channel for reception of the data signals carried on it, and for simultaneously recombining onto the fiber circuit new data signals optically transmitted within the same wavelength channel.

Figure 5A:
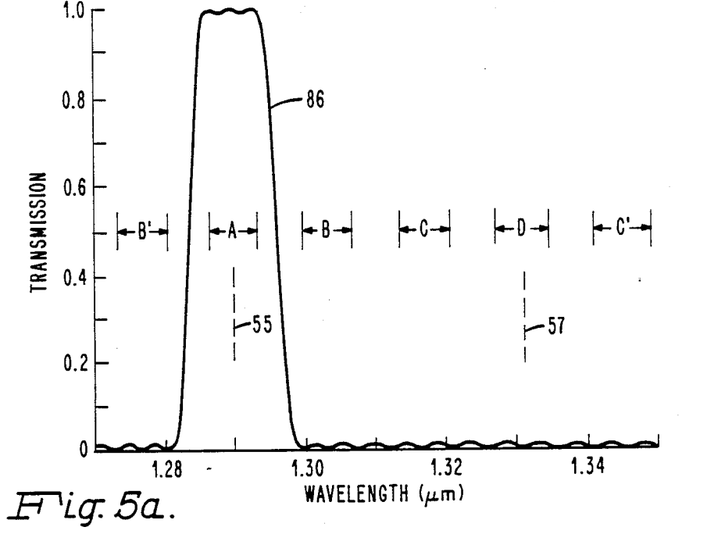
FIGS. 5a, 5b, 5c and 5d illustrate transmission functions which may be used with the combination channel demultiplexer/remultiplexer of FIG. 6 to divide an input beam having wavelengths in four channels such that one channel appear in one output beam and the remaining three channels appear in a second output beam.
Figure 5B:
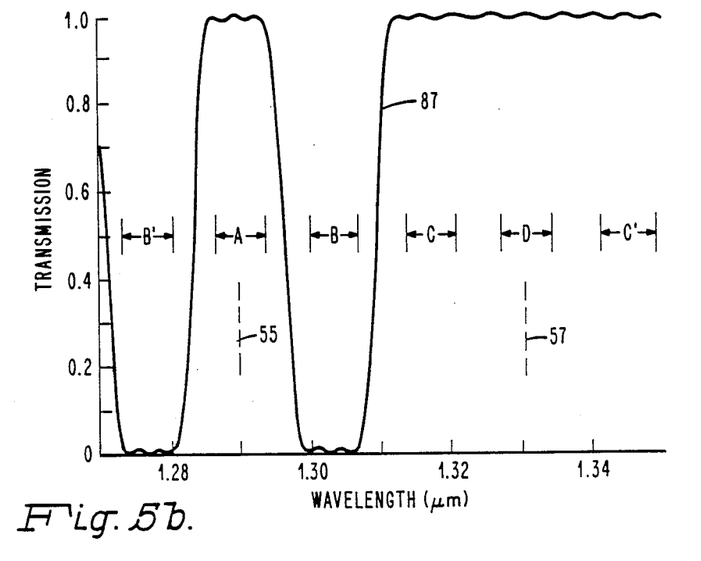
Figure 5C:
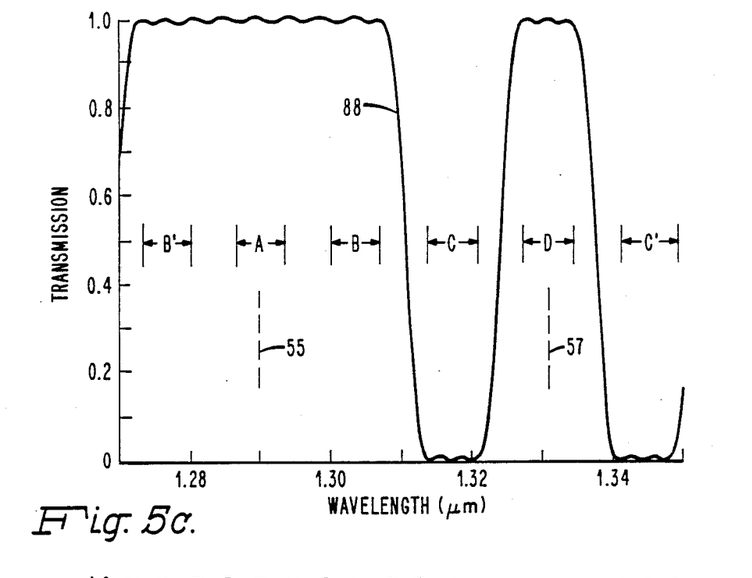
Figure 5D:
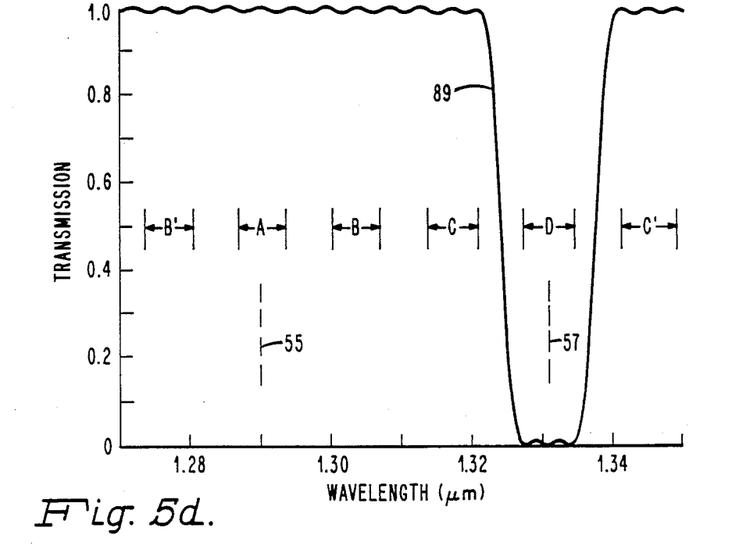

Transmission functions 87 and 88 of FIGS. 5b and 5c have passbands and stopbands with two or fourteen equal ripples reaching values of 0.99 or 0.01, and they are seventeenth order functions with six channels per period. Their corresponding birefringent filters can be synthesized using seventeen crystal elements 2.243 mm in thickness. Transmission function 86 and 89 of FIGS. 5a and 5d have passbands and stopbands with two or eight equal ripples reaching values of 0.99 or 0.01, and they are sixteenth order functions with six channels per period. Their corresponding birefringent filters can be synthesized using sixteen crystal elements 2.243 mm in thickness. In the single stage beam splitter of FIG. 6, the quartz crystal elements of filter sequence 54 are identical in size to those of sequences 45, and 47 supra for all transmission functions 83–89.

The synthesis procedure by which the fast axis orientations of each birefringent crystal element are calculated starts with the $n+1$ Fourier coefficients of an nth order even periodic transmission function. See Harris et al., supra.

As required, all of the equiripple functions of FIGS. 4a, 4b, 4c and 5a, 5b, 5c and 5d range between values of 1.00 and 0.00, and the deviations from these values in the passband and stopband have been chosen to be 0.01 to limit the channel crosstalk to $-20$ db. Since an nth order periodic function may have as many as n maxima and n minima values per period, they may be distributed between the passbands and stopbands to determine the relative widths and locations of these bands within the period. The first step therefore is to calculate the Fourier coefficients of the transmission function with desired maxima and minima values.

A suitable algorithm described in A. Oppenheim and R. Schafer, "Digital Signal Processing," (Prentice-Hall, Englewood Cliffs, N.J., 1975), pp. 255–258, was devised for the design of digital electric filters. The alternating maxima and minima with their specified values are initially assumed to be uniformly spaced across the period. Fourier coefficients are then computed to give a least squares fit to the specified values. The maxima and minima of the Fourier sum are located numerically by finding the zeros of the derivative function. Again, using the specified values and their revised locations, a new set of Fourier coefficients is computed. The iteration is repeated until the Fourier sum has negligible overshoot above 1.00 and below 0.00. The results of such computations are the Fourier coefficients listed in Table I for the transmission functions 83 through 87 of FIG. 7.

Several different sets of complex amplitude coefficients representing optical amplitude functions, each of whose magnitude squared is the optical intensity function, are computed from the Fourier coefficients of the desired intensity transmission function and its complement. See Harris et al., supra.

By choosing any one set of complex amplitude coefficients derived from each of the two intensity functions for the actual filter synthesis, there is obtained a multiplicity of valid solutions for the element orientation angles. They differ only in their optical phase response versus wavelength.

Alternate Construction

A greater number of optical channels can be demultiplexed (or multiplexed) by using additional stages. In a demultiplexing mode, with g stages it is possible to separate $2^g$ channels, each stage evenly dividing the input channels between its two output channels. The $2^g$ channels would be evenly spaced across one half period of the birefringent filters comprising the g stages and each stage would have a transmission function with even symmetry about optical frequencies at the centers of the longest and shortest wavelength channels of the $2^g$ channel sequence. As in the four-channel case detailed above, there would be two adjacent sets of $2^g$ channels unused and sequence reversed because of the even symmetry of the transmission functions. The geometrical configuration of an eight-channel multiplexer/demultiplexer would of necessity differ from that of FIGS. 3a, 3b and 3c and could, for example, be constructed as described in U.S. Pat. No. 4,744,075, issued May 10, 1988.

Although the specific embodiments are described in terms of birefringent filters consisting of quartz crystal elements, it is to be understood that many other birefringent crystals may be used.

TABLE I

| | FOURIER COEFFICIENTS TRANSMISSION FUNCTIONS | | | | | | |
|---|---|---|---|---|---|---|---|
| | 83 | 84 | 85 | 86 | 87 | 88 | 89 |
| $a_0$ | .500000 | .329377 | .500000 | .161143 | .674305 | .674305 | .838857 |
| $a_1$ | .000010 | .000000 | .627330 | .298353 | −.324053 | .324053 | .298353 |
| $a_2$ | .000000 | .529995 | .000000 | .259036 | .230500 | .230500 | −.259036 |
| $a_3$ | .603555 | .000000 | −.201437 | .201211 | .400492 | −.400492 | .201211 |
| $a_4$ | .000000 | .257985 | .000000 | .134587 | .161801 | .161801 | −.134587 |
| $a_5$ | −.000008 | .000000 | .112043 | .069560 | −.042244 | .042244 | .069560 |
| $a_6$ | .000000 | .009530 | .000000 | .015051 | −.015203 | −.015203 | −.015051 |
| $a_7$ | −.000006 | .000000 | −.071243 | −.023147 | .039985 | −.039985 | −.023147 |
| $a_8$ | .000000 | −.095348 | .000000 | −.043150 | −.022769 | −.022769 | .043150 |
| $a_9$ | −.139837 | .000000 | .047195 | −.046779 | −.089468 | .089468 | −.046779 |
| $a_{10}$ | .000000 | −.069393 | .000000 | −.038532 | −.055961 | −.055961 | .038532 |
| $a_{11}$ | .000003 | .000000 | −.031285 | −.024101 | .004309 | −.004309 | −.024101 |
| $a_{12}$ | .000000 | −.005559 | .000000 | −.008864 | .007812 | .007812 | .008864 |
| $a_{13}$ | .000001 | .000000 | .020214 | .003248 | −.010418 | .010418 | .003248 |
| $a_{14}$ | .000000 | .024868 | .000000 | .010296 | .001335 | .001335 | −.010296 |
| $a_{15}$ | .036282 | .000000 | −.012411 | .012250 | .021396 | −.012396 | .012250 |
| $a_{16}$ | .000000 | .018545 | .000000 | .010433 | .018179 | .018179 | −.010433 |
| $a_{17}$ | .000000 | .000000 | .009595 | .009404 | .000000 | .000000 | .009404 |

What is claimed is:

1. An optical multichannel wavelength demultiplexer for dividing an input consisting of a plurality of adjacent channels of optical signals among a number of outputs, comprising:
   at least two birefringent filter stages;
   each of said filter stages having a transmission function with even symmetry about optical frequencies at the centers of both the longest and shortest wavelength channels within said plurality of adjacent channels;
   each of said birefringent filter stages being constructed from a plurality of identical crystal elements; and
   the identical elements of each of said birefringent filter stages are identical to the elements of every other birefringent filter stage, the number of said identical elements in each stage being determined by said transmission functions.

2. An optical multichannel wavelength multiplexer comprising:
   at least two cascaded birefringent filter stages;
   each of said stages capable of combining inputs consisting of a plurality of optical signals into a single output consisting of a plurality of adjacent channels of optical signals;
   each of said filter stages having a transmission function with even symmetry about optical frequencies at the centers of both the longest and the shortest wavelength channels in its input;
   each of said birefringent filter stages being constructed from sequences of crystal elements of identical size;
   such that the identical elements of each birefringent stage are identical to the elements of every other birefringent stage, the number of identical elements in each stage being determined by said transmission functions.

3. An optical birefringent multichannel wavelength demultiplexer comprising:
   a single birefringent filter stage having an input consisting of optical signals of a plurality of adjacent channels;
   said filter stage having any one of a set of transmission functions to divide said input into two outputs whereby optical signals of at least any one channel appear on one output and optical signals of the remaining adjacent channels of said input appear on a second output;
   each of said transmission functions having even symmetry about optical frequencies at the centers of both the longest and the shortest wavelength channels in its input;
   each of said transmission functions capable of being synthesized from a number of elements from a single source of identical birefringent crystal elements; and
   said filter stage is constructed from a sequence of crystal elements from said source, the number of elements being dependent on the transmission function chosen from said set.

4. An optical birefringent multichannel wavelength multiplexer comprising:

a single birefringent filter stage having two inputs consisting of optical signals of a plurality of adjacent channels;

said filter stage having any one of a set of transmission functions to combine optical signals of at least any one channel appearing on one input with optical signals of the remaining adjacent channels appearing on a second input to appear together on a single output;

each of said transmission functions having even symmetry about optical frequencies at the centers of both the longest and the shortest wavelength channels in its input;

each of said transmission functions capable of being synthesized from a number of elements from a single source of identical birefringent crystal elements; and said filter stage is constructed from a sequence of crystal elements from said source, the number of elements being dependent on the transmission function chosen from said set.

5. A multichannel optical wavelength multiplexer/demultiplexer comprising:

a plurality of birefringent filter stages coupled in series, each of said filter stages having:

a first polarizing beam splitter prism for converting a collimated input beam of light whose polarization state is immaterial into two orthogonal linearly polarized output beams, said output beams being parallel to each other;

a sequence of identical birefringent crystal elements, said crystal elements having computed rotational orientations around the optical path direction;

each of said crystal elements having an input face and output face, said faces being parallel, for receiving output beams from said polarizing beam splitter prism;

said sequence of birefringent crystal elements having a length and transfer function such that certain wavelengths pass therethrough with their polarization unchanged and the remaining wavelengths have their polarization changed to the orthogonal state;

a second polarizing beam splitter prism identical to said first, for recombining two orthogonal linearly polarized beams of light oriented after said sequence of birefringent crystal elements; such that for each stage;

in a demultiplexing mode, upon application of an input beam to said first polarizing beam splitter, horizontally and vertically polarized components thereof are separated thereat, independently traverse said sequence of birefringent crystal elements, and are recombined to form output beams upon reaching said second polarizing beam splitter prism; and in a multiplexing mode, upon application of a plurality of input beams to said second polarizing beam splitter prism, horizontally and vertically polarized components thereof are separated thereat, independently traverse said sequence of birefringent crystal elements in a reverse direction and are recombined to form an output beam upon reaching said first polarizing beam splitter prism;

means to cascade said stages comprising:

said second polarizing beam splitter prism of one stage is coupled to said first polarizing beam splitter prism of the next stage in said series; such that in a demultiplexing mode, each input beam to a stage emerges as two filtered output beams to be processed independently in the next succeeding stage, and each beam outputted from the last stage in a series consists of one demultiplexed channel wavelength; and in a multiplexing mode, a plurality of input beams, each at the proper channel wavelength pass through successive stages until they are combined into a single beam and emerge as a multiplexed beam from the last stage in said series;

a set of transmission functions, each of which may be used in one birefringent filer stage of said multistage filter;

each of said transmission functions having even symmetry about optical frequencies at the centers of both the longest and shortest wavelength channels;

whereby said symmetry common to all transmission functions in said set permits all of said birefringent filter stages to be constructed from a sequence of identical crystal elements from a single source of identical birefringent crystal elements, the number of elements being dependent on the transmission function chosen from said set.

6. An optical multichannel wavelength multiplexer/demultiplexer for combining/dividing an input consisting of a plurality of optical signals into a single/multiple output, comprising:

at least two cascaded birefringent filter stages;

each of said filter stages having a transmission function with even symmetry about optical frequencies at the centers of both the longest and shortest wavelength channels within said plurality of adjacent channels;

wherein each of said optical signals consists of light within an optical wavelength band determined by said transmission functions; and whereby the identical elements of each birefringent stage are identical to the elements of every other birefringent stage, the number of identical elements in each stage being determined by said transmission functions.

7. The multiplexer/demultiplexer of claim 6, wherein each of said birefringent filter stages comprises:

a sequence of identical crystal elements which have computed rotational orientations around the optical path direction;

first and second polarizing beam splitter prisms coupled to opposite ends of said sequence, said first prism serving to receive optical inputs signals at one end of said sequence and said second prism serving to output optical signals at the opposite end of said sequence.

8. A demultiplexer for dividing an optical signal consisting of n evenly-spaced adjacent channels among a number of outputs, comprising:

at least two filter stages;

each of said filter stages having a transmission function with even symmetry about a common first and second optical frequency corresponding to the center wavelengths of the first and last channels, respectively, of said adjacent channels;

said transmission function being one of a particular set of said transmission functions such that an optical signal on each of said channels, while progressing through a corresponding set of filter stages, is filtered by a different sequence of passbands and stopbands depending on the wavelength values of said signal within said channels;

means for constructing said filter stages with a plurality of crystal elements from a single source of identical birefringent crystal elements, wherein said symmetry permits the synthesis of any one of said selected transmission functions with a common-length crystal element; and means for serially cascading said filter stages.

9. The demultiplexer as recited in claim 8 wherein:
each of said transmission functions has a different sequence of n adjacent passband and stopband filter characteristics across the same portion of the wavelength spectrum as occupied by said n input channels.

10. The demultiplexer as recited in claim 9 wherein:
said passband has an approximate value of one for all wavelengths within said passband whereby the linear polarization state of a wavelength signal processed by said passband will remain unchanged.

11. The demultiplexer as recited in claim 9 wherein:
said stopband has an approximate value of zero for all wavelengths within said stopband whereby the linear polarization state of a wavelength signal processed by said stopband will change to the orthogonal state.

12. A multichannel optical wavelength demultiplexer for dividing a plurality of n evenly-spaced adjacent wavelength channels on an input optical beam among two sets of channels in any desired combination, comprising:

a single birefringent filter stage;

said single filter stage having a selected one of a plurality of transmission functions with even symmetry about common optical frequencies at the centers of both the longest and shortest wavelength channels;

each of said transmission functions having a different sequence of n adjacent passbands and stopbands across the same portion of the wavelength spectrum as occupied by said n input channels;

each of said channels being processed by either a passband or stopband, depending on the wavelength values within said channel, during transmission through said single filter stage whereby one set of channels is filtered by a set of passbands and appears at one output and the other set of channels is filtered by a set of stopbands and appears at another output; and means for synthesizing said one transmission function with a plurality of crystal elements from a single source of identical birefringent crystal elements, wherein said symmetry permits the synthesis of any one of said selected transmission functions with a plurality of crystal elements from said single source.

13. The demultiplexer as recited in claim 12 wherein:
said passband has an approximate value of one for all wavelengths within said passband, whereby the linear polarization state of a wavelength signal processed by said passband will remain unchanged.

14. The demultiplexer as recited in claim 12 wherein:
said stopband has an approximate value of zero for all wavelengths within said stopband, whereby the linear polarization state of a wavelength signal processed by said stopband will change to the orthogonal state.

15. A multiplexer for combining n separate optical channels into a single output signal, said channels occupying adjacent portions of the wavelength spectrum, comprising:

at least two filter stages;

each of said stages having one of a plurality of periodic transmission functions with even symmetry about common first and second optical frequencies corresponding to the center wavelengths of the first and last channels, respectively, of said n input channels;

said transmission function being one of a particular set of transmission functions such that each of said input channels, while progressing through a corresponding set of filter stages, is filtered by a sequence of passbands and stopbands that is different for each of said channels;

means for constructing said filter stage with a plurality of crystal elements from a single source of identical birefringent crystal elements, wherein said symmetry permits the synthesis of any one of said transmission functions with a common-length crystal element; and means for serially cascading said filter stages.

16. The multiplexer as recited in claim 15 wherein:
each of said transmission functions has a different sequence of n adjacent passband and stopband filter characteristics across the same portion of the wavelength spectrum as occupied by said n input channels.

17. The multiplexer as recited in claim 16 wherein:
said passband has an approximate value of one for all wavelengths within said passband, whereby the linear polarization state of a wavelength signal processed by said passband will remain unchanged.

18. The multiplexer as recited in claim 16 wherein:
said stopband has an approximate value of zero for all wavelengths within said stopband, whereby the linear polarization state of a wavelength signal processed by said stopband will change to the orthogonal state.

19. A multichannel optical wavelength demultiplexer/remultiplexer, comprising:

a single birefringent filter stage having a first polarizing beam splitter, a sequence of identical, equal length birefringent crystal elements, and a second polarizing beam splitter;

said single stage having a primary input beam, a secondary input beam, a primary output beam and a secondary output beam for inputting and outputting a plurality of n adjacent wavelength channels;

said single filter stage having a selected one of a plurality of periodic transmission functions with even symmetry about common optical frequencies at the centers of both the longest and shortest wavelength channels;

each of said transmission functions having a different sequence of n adjacent passband and stopband filter characteristics across the same portion of the wavelength spectrum as occupied by said n input channels;

said selected transmission function having transmission characteristics such that one selected set of channels falls within a set of passbands and the remaining set of channels falls within a set of stopbands; and means for constructing said single filter stage with a plurality of crystal elements from a single source of identical birefringent crystal elements, wherein said symmetry permits the synthesis of any one of said transmission functions with identical crystal elements from said single source;

whereby said single birefringent filter stage separates a plurality of n adjacent wavelength channels on said primary input beam into two sets of channels in any desired combination, such that said first set emerges on said secondary output beam and, concurrently, a secondary input beam consisting of optical signals within the same wavelength channels as said first set simultaneously combines with said remaining second set to emerge as a primary output.

20. The demultiplexer/remultiplexer filter as recited in 19 wherein:

said passband has an approximate value of one for all wavelengths within said passband whereby the linear polarization state of a wavelength signal processed by said passband will remain unchanged.

21. The demultiplexer/remultiplexer as recited in claim 19 wherein:

said stopband has an approximate value of zero for all wavelengths within said stopband whereby the linear polarization state of a wavelength signal processed by said stopband will change to the orthogonal state.

22. The demultiplexer/remultiplexer of claim 19 wherein said selected transmission function divides and recombines said input beams into two sets, each set having all wavelength components of one-half the input channels in its primary output and all the wavelength components of the remaining half of the input channels in its secondary output.

23. The demultiplexer/remultiplexer of claim 19 wherein said selected transmission function divides and recombines said input beams into two sets, one set having all the wavelength components of a single input channel in its primary output and the second set having all the wavelength components of all the remaining input channels in its secondary output.

24. An optical demultiplexer/remultiplexer comprising:

a single birefringent filter stage having in series a first polarizing beam splitter, a sequence of identical, equal length birefringent crystal elements, and a second polarizing beam splitter;

said filter stage having any one of a set of transmission functions to separate input signal components within one of n wavelength channels to appear on one output and input signal components of the remaining adjacent channels to appear on a second output;

each of said transmission functions having even symmetry about optical frequencies at the centers of both the longest and the shortest wavelength channels in its input;

each of said transmission functions capable of being synthesized from a number of elements from a single source of identical birefringent crystal elements; and said filter stage is constructed from a sequence of crystal elements from said source, the number of elements being dependent on the transmission function chosen from said set.

* * * * *